United States Patent
Selander et al.

(10) Patent No.: US 10,555,241 B2
(45) Date of Patent: Feb. 4, 2020

(54) METHOD IN A NETWORK NODE FOR PROVIDING A DEVICE ACCESS TO A NETWORK

(71) Applicant: TELEFONAKTIEBOLAGET LM ERICSSON (PUBL), Stockholm (SE)

(72) Inventors: Göran Selander, Bromma (SE); Elena Dubrova, Sollentuna (SE); Fredrik Lindqvist, Järfälla (SE); Mats Näslund, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 57 days.

(21) Appl. No.: 15/566,104

(22) PCT Filed: Apr. 16, 2015

(86) PCT No.: PCT/SE2015/050440
§ 371 (c)(1),
(2) Date: Oct. 12, 2017

(87) PCT Pub. No.: WO2016/167694
PCT Pub. Date: Oct. 20, 2016

(65) Prior Publication Data
US 2018/0092025 A1 Mar. 29, 2018

(51) Int. Cl.
*H04W 48/06* (2009.01)
*H04W 74/08* (2009.01)
(Continued)

(52) U.S. Cl.
CPC ........... *H04W 48/06* (2013.01); *H04L 63/123* (2013.01); *H04L 63/1458* (2013.01);
(Continued)

(58) Field of Classification Search
None
See application file for complete search history.

(56) References Cited

U.S. PATENT DOCUMENTS

| 7,197,639 | B1 * | 3/2007 | Juels | H04L 63/08 380/277 |
| 2003/0172159 | A1 | 9/2003 | Schuba et al. | |

(Continued)

FOREIGN PATENT DOCUMENTS

| EP | 1631037 A1 | 3/2006 |
| EP | 2670206 A1 | 12/2013 |

(Continued)

OTHER PUBLICATIONS

The extended European Search Report issued in Application No. 15889334.7 dated Oct. 15, 2018, 5 pages.
(Continued)

*Primary Examiner* — Rebecca E Song
(74) *Attorney, Agent, or Firm* — Rothwell, Figg, Ernst & Manbeck, P.C.

(57) ABSTRACT

The disclosure relates to a method (30) for a network node (6, 7, 8) of a wireless network (1) of providing a device (5, 9) access to the wireless network (1). The method (30) comprises receiving (31), from a device (5, 9), an access request comprising a preamble; establishing (32), in response to the access request, a computational puzzle based on the received preamble; and sending (33) the computational puzzle to the device (5, 9). A corresponding method in a device is also disclosed, as are a network node (6, 7, 8), device (5, 9), computer programs and computer program products.

22 Claims, 5 Drawing Sheets

(51) Int. Cl.
  *H04L 29/06* (2006.01)
  *H04W 12/04* (2009.01)
  *H04W 12/08* (2009.01)
  *H04L 9/08* (2006.01)

(52) U.S. Cl.
  CPC .......... *H04W 12/04* (2013.01); *H04W 12/08* (2013.01); *H04W 74/0841* (2013.01); *H04L 9/0816* (2013.01); *H04L 2463/061* (2013.01)

(56) References Cited

U.S. PATENT DOCUMENTS

| | | | | |
|---|---|---|---|---|
| 2006/0047968 | A1* | 3/2006 | Nakagawa | G06F 21/55 |
| | | | | 713/176 |
| 2007/0157300 | A1* | 7/2007 | Sivaradjane | H04L 63/1458 |
| | | | | 726/9 |
| 2009/0042582 | A1 | 2/2009 | Wang et al. | |
| 2009/0217386 | A1* | 8/2009 | Schneider | H04L 9/3271 |
| | | | | 726/30 |
| 2013/0301541 | A1* | 11/2013 | Mukherjee | H04W 74/0833 |
| | | | | 370/329 |

FOREIGN PATENT DOCUMENTS

| | | |
|---|---|---|
| WO | 2008156392 A1 | 12/2008 |
| WO | 2014110774 A1 | 7/2014 |

OTHER PUBLICATIONS

International Search Report and Written Opinion issued in Application No. PCT/SE2015/050440 dated Jan. 18, 2016, 15 pages.
Juels, Ari et al.: "Client Puzzles: A Cryptographic Countermeasure Against Connection Depletion Attacs", RSA Laboratories, 1999, 15 pages.

* cited by examiner

METHOD IN A NETWORK NODE FOR PROVIDING A DEVICE ACCESS TO A NETWORK

CROSS REFERENCE TO RELATED APPLICATION(S)

This application is a 35 U.S.C. § 371 National Stage of International Patent Application No. PCT/SE2015/050440, filed Apr. 16, 2015, designating the United States, the disclosure of which is incorporated by reference.

TECHNICAL FIELD

The technology disclosed herein relates generally to the field of wireless communication, and in particular to methods and means for performing load balancing in and access to a network.

BACKGROUND

In a radio network, a Random Access CHannel (RACH) is used as the common entrance for all devices which request a dedicated communication channel. This includes devices which are accessing the network for the first time as well as those which have already been using the radio network but have temporarily lost their synchronization towards the radio network. A first message exchange is carried out between the device and a base station/access point of the radio network, and in particular over the Physical RACH (PRACH) where the bandwidth of an uplink (direction from the device to the base station) is very limited. In an "attach storm" scenario, this may cause heavy load on the RACH as well as on the base station/access point itself. A malicious or malfunctioning device could bypass existing procedures and cause a denial-of-service attack by exhausting channel resources and/or processing resources, by just overusing the existing attachment procedure. Such attach storms may also occur naturally, e.g. when thousands of devices located in a dense "hot spot" attempt to reconnect after a temporary outage.

Making radio network services unavailable for its subscribing users e.g. by such attach storms obviously causes dissatisfaction among the users, and should be prevented. Increasing the radio resources is not a feasible solution e.g. in view of the scarce nature thereof, nor is adding processing capacity to the base stations as this is an expensive solution.

In such overload or attach storm situation it would however still be desirable to allow e.g. devices that are or have been connected to the radio network but temporarily lost synchronization, a faster access to the radio network than those devices which have not yet connected to or established network services. The former type of devices may have ongoing conversation or data transfer and a fast reconnection might reduce user dissatisfaction.

SUMMARY

An objective of the present disclosure is to solve or at least alleviate at least one of the above mentioned problems.

The objective is according to an aspect achieved by a method for a network node of a network of providing a device access to the network. The method comprises receiving, from a device, an access request comprising a preamble; establishing, in response to the access request, a computational puzzle based on the received preamble; and sending information indicative of the computational puzzle to the device.

The method provides an advantage in that the computational puzzle may be adapted in view of the load of the network node. The computational puzzle can be made more difficult to solve by the devices seeking access when the network node is highly loaded and thereby create more idle time, since the network node can establish the computational puzzle with same effort irrespective of difficulty for the device. The method also provides a way of handling unprotected messages, such as random access requests, from unidentified devices that have not yet been authenticated. In particular, the network node may accept authentication of a device by virtue of the device having solved the computational puzzle and thereby having obtained knowledge of the resources to use in the communication.

The objective is according to an aspect achieved by a computer program for a network node of performing load balancing. The computer program comprises computer program code, which, when executed on at least one processor on the network node causes the network node to perform the method as above.

The objective is according to an aspect achieved by a computer program product comprising a computer program as above and a computer readable means on which the computer program is stored.

The objective is according to an aspect achieved by a network node of a network of providing a device access to the network. The network node is configured to receive, from a device, an access request comprising a preamble; establish, in response to the access request, a computational puzzle based on the received preamble; and send the computational puzzle to the device.

The objective is according to an aspect achieved by a method performed in a device for accessing a network comprising a network node. The method comprises selecting a preamble for use in an access request; sending, to the network node the access request, including the selected preamble; receiving, in response to the access request, information indicative of a computational puzzle from the network node; and solving the computational puzzle, thereby obtaining information on communication resources to use in subsequent signaling to the network node.

The objective is according to an aspect achieved by a computer program for a device for accessing a network. The computer program comprises computer program code, which, when executed on at least one processor on the device causes the device to perform the method as above.

The objective is according to an aspect achieved by a computer program product comprising a computer program as above and a computer readable means on which the computer program is stored.

The objective is according to an aspect achieved by a device for accessing a network comprising a network node. The device is configured to: select a preamble for use in an access request; send, to the network node the access request, including the selected preamble; receive, in response to the access request, information indicative of a computational puzzle from the network node; and solve the computational puzzle, thereby obtaining information on communication resources to use in subsequent signaling to the network node.

Further features and advantages of the present disclosure will become clear upon reading the following description and the accompanying drawings.

DETAILED DESCRIPTION

Figure 1:
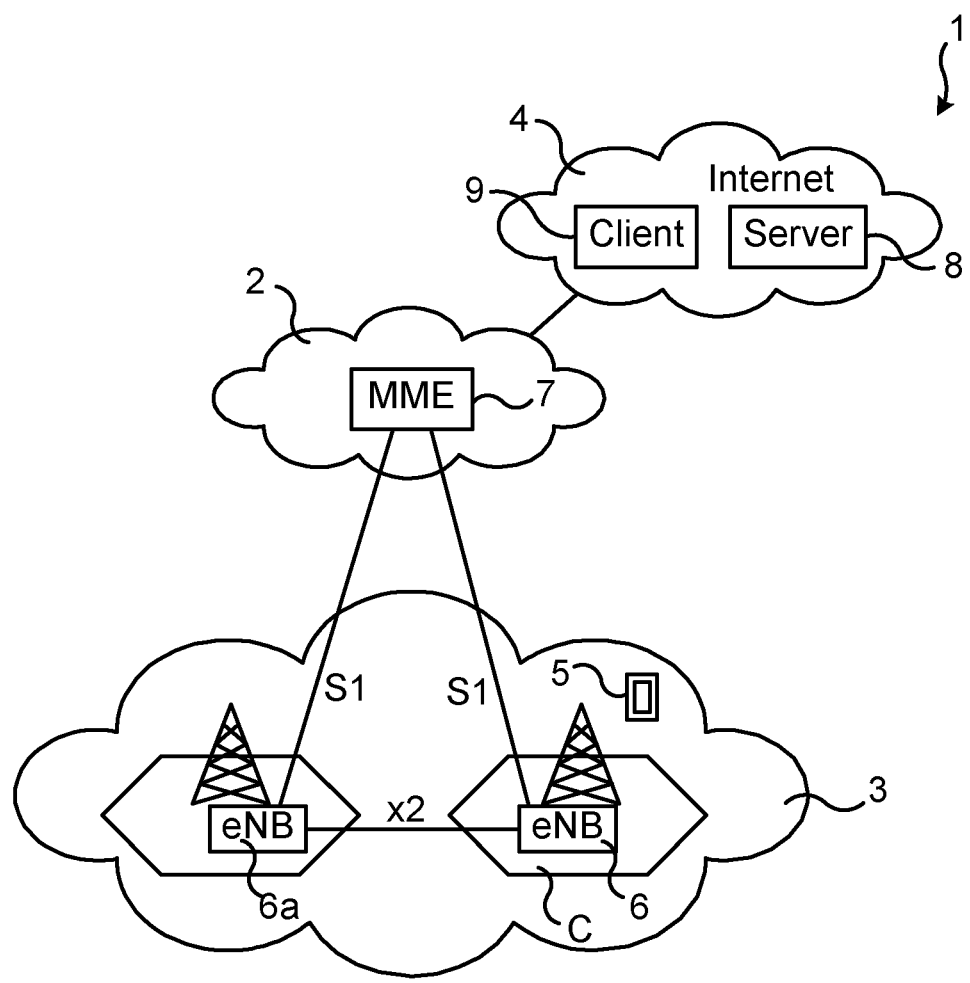
FIG. 1 illustrates schematically an environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In Internet Protocol (IP)-based networks, a mechanism known as "puzzles" (also denoted "client puzzle" or "computational puzzle") is sometimes used. The puzzle aims at causing a small additional computational load on a client, thereby creating a period of idle time for a server handling requests from clients. In these existing puzzle mechanisms, a drawback is that the client could simply guess a solution without actually performing any computation and respond with this guess. While the guess is most likely wrong, it still causes load on the server (and network) since the server must receive the solution and verify whether the solution is right or wrong. Transporting and verifying the solution of a puzzle incurs an overhead both on the communication and in terms of processing load.

The inventors behind the present teachings have realized and explored usability of such puzzles also in the context of radio networks, as a way to, for instance, balance load on network nodes such as base stations. Further, in various aspects, improvements of such puzzles are provided, which are applicable for both non-wireless networks (e.g. IP-networks) as well as radio networks.

As mentioned in the background section, e.g. devices that are or have been connected to the network should preferably be allowed faster access to the network. In contrast to prior art wherein there is no means to prioritize devices, the present teachings may, in various aspects, give priority to certain devices or categories of devices.

Priority may for instance be given to devices that are connected to the radio network in the earlier described attach storm situation, prioritizing these devices before devices that are non-connected. The prioritization by introducing puzzles in the context of radio networks may be done without causing too much load on the network node (e.g. base station), which could be the case e.g. if using an authentication procedure or other means.

To just introduce the known puzzle mechanism used in IP networks would make the task of solving the puzzles the same for all devices, i.e. no prioritization would be obtained. It is noted here that while prior art puzzles do allow a degree of control of the difficulty to solve the puzzle, they still do not enable prioritization of certain devices. This is because of the fact that the puzzle mechanism must be usable before the identity of a client device has been established and therefore nothing prevents a client device from falsely claiming that it belongs to a set of client devices that should be prioritized by being assigned an "easy" puzzle. In an aspect of the present disclosure, the prioritization of certain devices is enabled by using different so called preambles for different devices when creating the computational puzzles. If applying the present teachings in settings which do not use preambles, the device may instead provide some type of identifier and/or formatting an initial transmission in some other way so as to allow the network to distinguish the device.

While the amount of information carried in the puzzle solution of prior art is in a one-to-one correspondence with the difficulty to solve the puzzle, the present teachings provide ways to encode auxiliary information into puzzle solutions without also making the puzzle harder to solve. In the prior art puzzles, it is not possible to encode information into puzzle solutions without also making the puzzle harder to solve. In fact, prior art methods do not assign any information at all to the puzzle solution, besides a single binary bit informing that "the solution is valid", which may be wasteful.

Briefly, according to aspects of the present teachings the set of access preambles is partitioned into at least two sets: prioritized preambles (for prioritized devices, e.g. devices having a key) and non-prioritized preambles (for non-prioritized devices, e.g. devices without a key). Whether or not a device is prioritized or not may thus be based on whether or not the device has access to a certain key. In a first step of the random access procedure the device sends a preamble to a network node, e.g. a base station. Devices which possess a key are supposed to select and send a preamble from the prioritized set of preambles. Devices without a key are supposed to select and use non-prioritized preambles. It is noted that it is possible for a device to "cheat" and pretend to have a key, but, as will be shown in the following, the present teachings makes it possible to distinguish between cases where the device pretends to have a key and cases where the device actually has the key. It is noted that the sub-division into two types of devices, prioritized vs non-prioritized, is merely an example, and persons skilled in the art will realize also other sub-divisions and also that the devices may be divided also into more than two types of devices.

Upon receiving a preamble, or some other information indicating whether the device is prioritized (e.g. an identifier or special formatted message), the network node (e.g. base station) responds with a puzzle which depends on whether the device is prioritized or not, i.e. whether or not the preamble (or initial message) belongs to the set of prioritized preambles (or prioritized identifiers/message formats). Devices which submit prioritized preambles (messages) get in response a puzzle which is dependent on the key and cannot be efficiently solved without the key. This efficiently eliminates devices pretending to have the key. Devices which submit non-prioritized preambles get a puzzle which is not dependent on a key. The difficulty of the puzzle may for instance be set to vary depending on the overload.

In an aspect of the present teachings, a method is presented which is based on the distribution of a puzzle on the random access response in downlink. The puzzle is a computational problem and the solution to the puzzle specifies on what radio resource(s) the next message should be sent.

More generally, the puzzle solution, or parts thereof, specifies parameters necessary to access certain parts of the physical medium. The device requesting access thus needs to determine the solution to the puzzle in order to continue the access procedure. Solving the puzzle requires a computational effort, which introduces a delay for the device in the access procedure during which the solution is computed. In various aspects, the difficulty of the puzzle may be adjusted, thereby adjusting the delay and thus in effect smoothening network load over time. Puzzles may, as in prior art, be defined in terms of finding certain pre-images to certain cryptographic functions such as hash function and/or encryption algorithms.

In another aspect, the puzzle may be designed so that the computational effort for the device can be reduced when (if) given access to an additional parameter such as a cryptographic key. By pre-distributing a key to prioritized devices, these devices can thus more easily than un-prioritized devices solve the puzzle, determine the radio resource and continue the access procedure. A prioritized device may e.g. be a device which has (or recently had) access to the network and a non-prioritized device may be a device which is previously unknown to the network. In order to give priority to devices previously having access to the network, keys may be distributed to devices accepted by the network, and the key may be protected in transport by means of a secure channel established in connected state. The latter prevents an eavesdropping device from gaining knowledge about the key. Various different prioritization/privilege classes may also be determined based on subscription type, etc.

In still another aspect, encoding of additional information in the puzzle solution, e.g. related to which radio resource to use, is enabled.

Embodiments of the method are illustrated and described in the context of a state-of-the-art cellular radio access network, namely Long Term Evolution (LTE), and in particular 4G. It is however noted that the method is not limited to this particular use case; on the contrary, the method may be applied in other wireless access networks and settings, e.g. for peer-to-peer communications. The teachings of the present disclosure may be implemented also in non-wireless access networks.

FIG. 1 illustrates schematically a network 1, in particular an exemplary cellular wireless network 1 in which embodiments and aspects of the present teachings may be implemented. The network 1 comprises a radio access network 3 and a core network 2.

The radio access network 3 (RAN) provides wireless communications for terminals 5 residing within its coverage area. The radio access network 3 comprises a number of network nodes 6, 6a, e.g. denoted evolved NodeB (eNB) in case of LTE, communicating with the terminals 5 over a wireless interface, e.g. evolved Universal Mobile Telecommunications System (UMTS) Terrestrial Radio Access (e-UTRA) in case of LTE. Each such network node 6, 6a covers one or more geographical areas, denoted cells (or sometimes sectors), within which the wireless communication is provided to the terminals 5 residing in such cell. In FIG. 1 one such cell is indicated at "C", comprising the coverage area of a first network node 6. Each network node 6, 6a may provide coverage in one or several cells, and the network nodes 6, 6a may be interconnected and communicate e.g. over X2 interface. A communication link from the terminal 5 to the network node 6 is denoted uplink (UL), and the reverse link from the network node 6 to the terminal 5 is denoted downlink (DL).

The network nodes 6, 6a may be denoted in different ways, e.g. base stations, access points, radio access nodes etc. Similarly, the terminals 5 may also be denoted in different ways, e.g. depending on the radio access technology (RAT) implemented in the wireless network 1. The terminals 5 may for instance be denoted wireless device, mobile station, mobile terminal, user equipment (UE) etc., and may e.g. comprise a smart phone, a tablet computer etc. In the description these denotations may be used interchangeably.

The core network 2 comprises one or more core network nodes 7, e.g. Mobility Management Entity (MME) and serving gateway (SGW) and packet data network gateway (PDN-GW). Such core network nodes are collectively referred to by reference numeral 7. The core network nodes 7 may be interconnected to the network nodes 6, 6a of the RAN 3, e.g. by an S1 interface. The core network 2 may, and typically does provide the terminals 5 connectivity to an external packet data network (PDN) 4, comprising a server 8, a cluster of servers, databases and/or other entities. The external PDN 4 may for instance comprise the Internet. The present teachings may, as mentioned, be implemented in wired networks as well, e.g. such as in the PDN 4.

Within the PDN 4 a client device 9 may seek (wired) access to the server 8, and the present teachings may be used also for such communication attempts.

Figure 2:
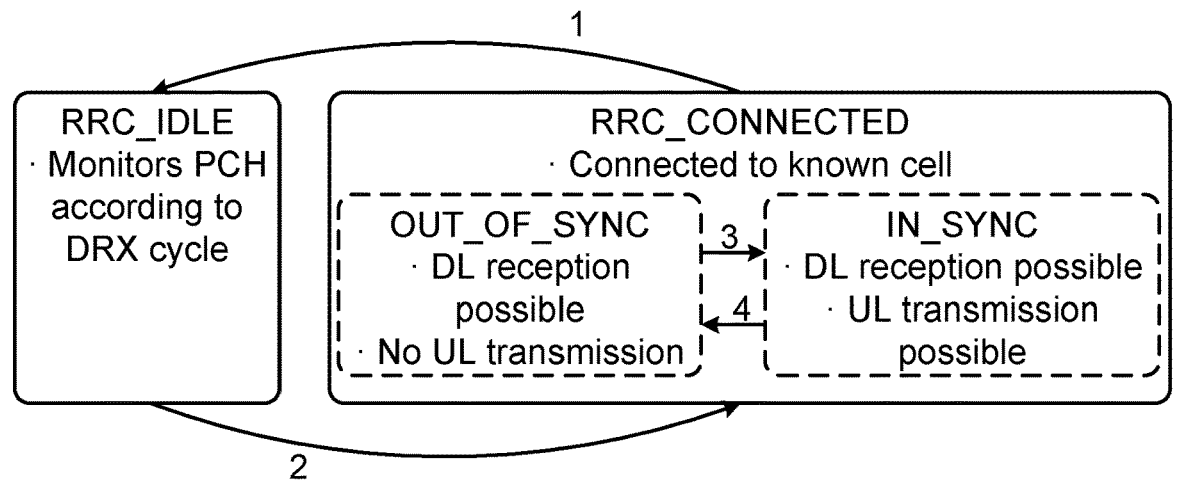
FIG. 2 illustrate possible states of a device in an LTE radio network.

FIG. 2 shows a known LTE state machine, which comprises two main states denoted RRC_IDLE and RRC_CONNECTED, RRC being abbreviation for Radio Resource Control. The role and characteristics of these states may be summarized as follows:

RRC_IDLE (leftmost box)
   The UE does not belong to any cell
   No RRC context
   Out of UL synchronization
   No UL data transmission (exception in RACH)
   In RRC_IDLE mode, the UE monitors a paging channel (PCH) according to a discontinuous reception (DRX) cycle.
RRC_CONNECTED (rightmost box)
   RRC context established
   Necessary parameters for communication known to both UE and network
   The cell to which the UE belong is known
   The Cell Radio Network Temporary Identifier (C-RNTI) has been configured. This is an identity of the UE used for signaling purposes between UE and network.

In RRC_CONNECTED mode, the UE 5 may be synchronized with the network node 6 (IN_SYNC, rightmost box within the RRC_CONNECTED box) or out of synchronization (OUT_OF_SYNCH, leftmost box within the RRC_CONNECTED box). When IN_SYNCH, the UE 5 is able to receive in DL and transmit in UL. When OUT_OF_SYNCH, the UE 5 is able to receive DL signaling but cannot transmit in UL. The UE 5 may be RRC connected, and move between these to states as indicated by arrows 3 and 4.

In order to move from RRC_IDLE to RRC_CONNECTED (arrow 2) the RACH procedures have to be carried out, as described more in detail later. From an energy saving perspective, as well as for saving network memory capacity that keeps the context of the UEs, it is advantageous to let the UE 5 move back (arrow 1) to the RRC_IDLE state after desired/requested transmission has been finalized in the RRC_CONNECTED state.

In the following, a known random access is initially described with reference to FIG. 3, for providing a thorough understanding of the present teachings.

There are various purposes for performing a Random Access (RA) in a cellular wireless network, which for the specific case of LTE can be summarized as:

To obtain initial access to move from state RRC_IDLE to RRC_CONNECTED (described more in detail later, compare arrow 2 of FIG. 2).

To re-establish a radio link after radio-link failure.

To establish uplink (UL) synchronization if uplink/downlink (DL) data arrives when the UE is in RRC_CONNECTED and UL not synchronized.

For handover when UL synch needs to be established to the new cell.

To enable a scheduling request channel if no dedicated resources have been configured for the UE on the control channel Physical Uplink Control Channel (PUCCH).

Figure 3:
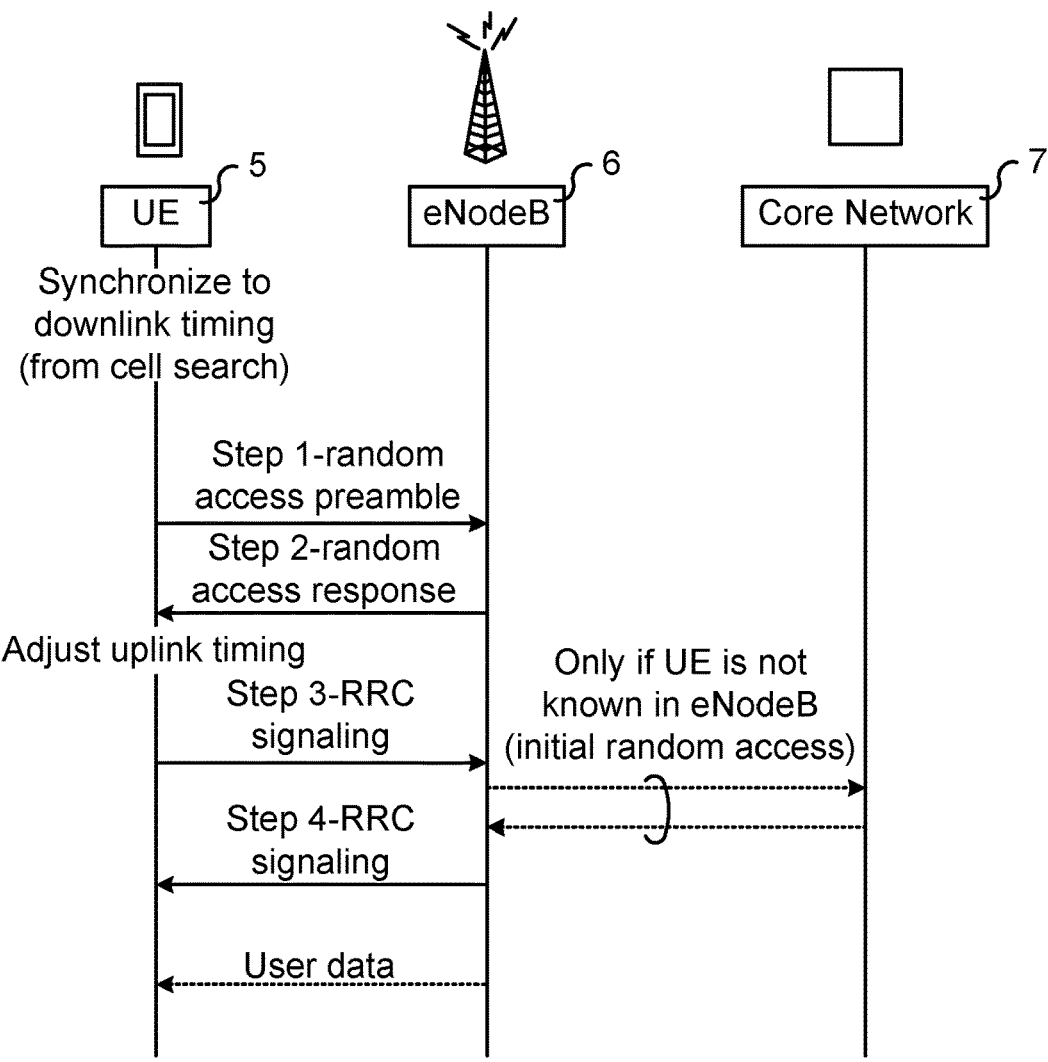
FIG. 3 is a sequence diagram illustrating a random access procedure.

FIG. 3 thus illustrates different steps involved in a known contention-based random access procedure.

Step 1

In contention-based random access (CBRA), the UE 5 randomly selects one access preamble from a known set of preambles used in common by all UEs. The set of preambles are sent to the UEs by the network node 6 over a broadcast channel. The purpose is to avoid or at least reduce risk of collisions by separating the preamble signals in the code domain. In LTE there are typically 64 different preambles in each cell to choose from which in turn may be divided into two groups. The grouping allows the UE 5 to signal with one bit whether it needs radio resources for a small or larger message (data package). That is, a randomly selected preamble from one group indicates that the UE 5 has a small amount of data to send while a preamble selected from the other group indicates that resources for a larger amount of data are needed.

The random access preamble is transmitted by the UE 5 only on certain time-frequency resources, Physical RACH (PRACH) opportunities, known to all UEs via the broadcast channel. Upon reception, the network node 6 detects all non-colliding preambles from which it can also estimate the roundtrip time (RTT) for each UE 5. The latter is of great importance in an Orthogonal Frequency Division Multiplexing (OFDM)-based system such as LTE which requires time and frequency synchronization in both downlink and uplink.

Step 2

The random access response (RAR) in step 2 between the network node 6 and the UE 5 carries the following information: timing-advance command (i.e. the RTT), Temporary UE identity (TC-RNTI) and UL resources for UE 5 to use in Step 3.

The random access response is scheduled on downlink shared channel (DL-SCH) (DL data, OFDM) and is indicated on a downlink control channel (Physical downlink control channel, PDCCH) using an identity reserved for random access responses, the so-called RA-RNTI. The received RTT (i.e. timing advance) allows the UE 5 to adjust its transmission window in order to be synchronized in the uplink, as required by OFDM transmission. All UEs that have transmitted a preamble monitor downlink control channels, in particular L1/L2 DL control channels (in all DL subframes) for a random access response within a configurable time window. This time window is configurable by the network node 6 (i.e. not fixed in the specifications). If the UE 5 doesn't detect a random access response within the time window it will declare the attempt as failed, and will typically repeat step 1 using an increased transmit power.

The received UL resource assignment to be used in step 3 is essentially a pointer to the time/frequency resource grid that informs the UE 5 exactly which subframes (time) to transmit on and what resource blocks (frequency) to use. A particular example of such pointer may comprise pointing to resource block number 10 four subframes later relative the time instance of the received random access response. The 3GPP LTE specification describes in detail how this message (i.e. a bit string) looks like when received by the UE 5 and how it shall be interpreted. This fairly short message is in the order of 10-20 bytes and depends on the system bandwidth. In general this message has been designed to minimize the number of bits needed to convey the resource assignment but at the same time to provide some flexibility for a scheduler of the network node 6 when deciding upon the resource assignment.

For a 5 MHz system, the entire random access response message is in the order of 80-160 bits, out of which 10-20 bytes are used to indicate the radio resource to use in step 3. The number of bits can be increased by an increase in time or modulation order. The number of radio resources can be further expanded by considering fractions of timeslots.

Step 3

Upon correct reception of the random access response in step 2, the UE 5 is now time synchronized with the network node 6. Before any transmission can take place a unique identity within the cell in which the UE 5 resides is assigned, the unique identity denoted C-RNTI. The UE transmission in this step uses the UL-SCH channel (UL data, Single-Carrier Frequency Division Multiple Access, SC-FDMA) on the radio resources assigned in step 2. Additional message exchange might also be needed depending on the UE state, as indicated in FIG. 3 by the arrows drawn with dashed lines. In particular, if the UE 5 is not known in the network node 6, then some signaling is needed between the network node 5 and the core network, in particular a core network node 7 thereof.

Step 4

A main purpose of this step is contention resolution, i.e. to resolve any random access response collisions that were not detected before. This step is not relevant for the present teachings and will not be described further.

When implementing various embodiments of the provided method some modifications to random access procedure are needed, which will be described next.

Computational Puzzles in the Random Access Response

If the network node 6 detects a vast number of preambles in step 1, or if the network node 6 is already in an overload situation, the continued message exchange may need to be slowed down in order to regulate the load situation. One mechanism for achieving this is to require the UEs to perform a computational task before being allowed or even able to continue. In various embodiments, the UL resource assignment in the random access response (step 2) may be replaced or extended by a computational puzzle (also denoted "puzzle" in the following). The puzzle may comprise a mathematical problem (described more in detail later) that requires some computational effort to be solved and thus delays the UE 5 before progressing in the message exchange.

Puzzles can be designed to be of different degree of difficulty, thus the computational effort required by the UE 5 and in turn the period of time before the UE 5 can send the message in step 3 may be tuned, for example as the function of the load of the network node 6 or of the number of detected preambles.

In various embodiments of the present teachings, the solution to the puzzle indicates which radio resource to use in step 3. Hence without solving the puzzle, the UE 5 is not even made aware of when and how to send subsequent messages. This provides an additional protection for the network node 6 since a malicious UE cannot easily disturb the communication for one particular UE 5 without jamming all potential radio resources that may be used in step 3. The problems of prior art relating to devices that continue to add load to the network node 6 by forcing the network node 6 to receive erroneous puzzle solutions may be avoided in that the UE 5 has to obtain a solution to the puzzle in order to be able to transmit (correctly) to the network node 6.

Further, it may optionally be requested, in step 3, that the solution to the puzzle or a proof or indication that the UE 5 has indeed solved the puzzle is added to the message. Such feature protects against cases of accidental successful guessing of which radio resources to use. It is noted that for this feature to have effect, the puzzle solution space must be larger than the number of possible radio resources; else all guessing would be successful.

Partitioning of Preambles

If the network node 6 detects a high number of preambles in step 1, collisions are likely to occur, so it is also favorable to prioritize the already known UEs. The known UEs comprise the UEs in RRC_CONNECTED state, and make the non-RRC_CONNECTED UEs, i.e. UEs in RRC_IDLE state, back-off for a certain time period. This would facilitate for UEs in out-of-synch RRC_CONNECTED mode to attempt (or reattempt) step 1 with reduced likelihood of collision. This presumes that the back-off time is larger than the time period to the next PRACH opportunity.

In various embodiments, such priority scheme may be obtained by partition the preambles into two sets:

$P_C$=Preambles intended for RRC_CONNECTED UEs, and $P_{NC}$=Preambles intended non-RRC_CONNECTED UEs (i.e. RRC_IDLE UEs).

This is similar to the earlier described known preamble partition mechanism for UEs used for indicating if the UE has small or large message to send, i.e. the grouping of preambles into a two groups of preambles based on data buffer size. Thus, if implementing also the above suggested partitioning of preambles based on UE state, there may be in total four partitions: two groups of preambles for indicating the amount of data and two "sub-partitions" for indicating whether the UE 5 is "connected" (prioritized) or not. In other embodiments, there may also be sets of new preambles defined for UEs supporting the puzzle mechanism. Depending on its state the UE 5 should select a preamble in the relevant set and send it in step 1. It is noted that a "malicious" UE may attempt to falsely claim that it is in RRC_CONNECTED state, aiming to quickly get access. As will be clear from the following there is nothing to gain from such false claims, it will actually only make it worse, i.e. "honesty prevails".

Tunable Puzzles

As noted above, UEs may misbehave: a non-RRC_CONNECTED UE may send a preamble from preamble group $P_C$ in order to try to gain a radio resource from the set of resources reserved for the RRC_CONNECTED UEs. In addition to the described random access response puzzle mechanism, a concept of tunable puzzles is introduced. There may be two different kinds of puzzles:

1. Puzzles which can be feasibly solved only when having access to a key. This first set of puzzles is denoted $P_{Zk}$.

2. Puzzles which can be feasibly solved also without a key. This second set of puzzles is denoted $P_{Znk}$.

If, in step 1 of the random access procedure (reference is made to FIG. 3), the network node 6 receives a preamble from preamble group $P_C$, then it may reply (in step 2) with a tunable puzzle from the first set of puzzles $P_{Zk}$. The key corresponding to the tunable puzzle is shared with a UE 5 when it is in RRC_CONNECTED state. If the network node 6 receives a preamble from preamble group $P_{NC}$, then it replies with a non-tunable puzzle from the second set of puzzles $P_{Znk}$.

A malicious, non-RRC_CONNECTED UE sending a preamble from preamble group $P_C$ in step 1 will, in step 2, receive a tunable puzzle and will not be able to solve it by performing a feasible amount of computations. Therefore this UE is prevented from obtaining knowledge about the radio resource intended for RRC_CONNECTED UEs. Making such false claim thus only makes it worse for the UE, in that an "easier", i.e. solvable, puzzle would instead have been obtained by truthfully claiming to be non-RRC_CONNECTED.

In this way the network node 6 may control the amount of allowed radio resources between UEs in RRC_CONNECTED state and non-RRC_CONNECTED state. In particular, the network node 6 may allow access only for UEs in RRC_CONNECTED state.

Keys for UEs in RRC_CONNECTED State

According to current 3GPP standards, the UE 5 establishes a secure (encrypted and integrity protected) communication channel with the network node 6 as part of attaining the RRC_CONNECTED state. This secure channel can be used for transporting and/or establishing the key needed for solving tunable puzzles. Keys and tunable puzzles may be replaced on a regular basis. Replacement of keys and puzzles ensures that UEs that have not been connected for a long time will not be given priority, since the corresponding key is then revoked. Hence a new key needs to be established on a regular basis for the RRC_CONNECTED UEs.

The key may be transported after establishing that a UE 5 is in RRC_CONNECTED state and the key may be configured via the Radio Resource Control (RRC) signaling using RRC messages on a physical layer transported on a downlink control channel. This may be implemented as a new RRC message or as a piggyback or extension of an existing RRC message. That is, the network node 6 may first establish that the UE 5 is in the RRC_CONNECTED state, e.g. by means of the network node 6 having access to the UE context. The network node 6 may then send the key to the UE e.g. in a new RRC message or as an extension of an existing RRC message.

Constructing the Puzzle

As mentioned, different embodiments may be based on conventional puzzles or novel "tunable puzzles", the latter further enabling prioritization of certain UEs. In the following, a description on how puzzles (also denoted computational puzzles) can be adapted to create a basic "back-off"/"off load" mechanism according to an aspect of the present teachings.

The concept of client puzzle protocol for denial-of-service mitigation in Internet communication is known, e.g. Client Puzzle Protocol (CPP). However, the use of puzzles as a means of localizing a (physical) destination address in general, and radio resources in particular is introduced in an aspect of the present teachings. It is noted that while non-physical addresses/resources are considered to be within the scope of the present teachings, the effect of really forcing the device to solve the puzzle in order to access the physical medium (e.g. radio, signals over copper of fiber) is mainly effective for physical resources or other parameters affecting the physical transmission, e.g. coding schemes or modulation.

For the purpose of the present description the puzzle is represented as a bit string p of length n, the solution to the puzzle as a bit string s, such that F(s)=p, where F is a function with certain properties. Some basic requirements may comprise:

It should be easy for the access network to generate, or feasible to pre-calculate, p n should be set according to the available bandwidth in step 2 (n is also related to difficulty of solving the puzzle)

The function F should be possible to compute easily but hard to invert, e.g. F may be a one-way function.

In the following, it is assumed that the puzzle solutions s are of form s=s'||s" where s" may be empty. Supposing s' is t bits in size and s" is u bits in size (where u may be zero), the solution to the puzzle would be the v:=t+u bit solution s:=s'||s".

Assuming as a simple example, that F is a cryptographic hash, such as for instance Secure Hash Algorithm (SHA)-256 or Whirlpool, or a function based on AES. Then p=F(s) is a puzzle with solution s. To make the puzzle p possible to solve, the length of the solution s should be limited to allow exhaustive search in reasonable time. To manage the relations between the number of bits in the input and output relative to the desired "difficulty" of the puzzles, the input and output can, as in prior art, be padded with bit strings a and b:

$$a\|p = K(b\|s)$$

where "||" denotes concatenation, i.e. the operation of joining the bit strings end-to-end which is dependent on the actual radio setup or communication setup during the message exchange between UE 5 and network node 6.

The numbers a and b may be fixed for all random access requests, e.g. constants defined in a standard (e.g. a= 000 . . . 0), or specified by the standard to have a certain value which is dependent on the actual radio setup or communication setup during the message exchange between a device, e.g. UE 5, and a network node, e.g. network node 6 of the radio access network. For example, the numbers a and b may be dependent on the actual random access request, on data that both the UE 5 and network node 6 know, e.g. related to the preamble, on RA-RNTI, or on other radio parameter or network parameter. In common for the numbers a and b is that they are known by the UE 5 and by the network node 6 and thus need not be guessed or calculated.

It is noted that the function F is typically not 1-1, wherein one puzzle has only one solution. Several (b, s) values could thus give the same (a, p) output. In puzzles according to prior art, this would be acceptable as any solution is considered admissible due to the fact that the solution is not used after it has been verified. According to aspects of the present teachings, this is not desirable, and in various embodiments auxiliary information is encoded into the solution and this information has a "semantic meaning". Finding a wrong solution (i.e. not the intended one) means that the device 5, 9 gets the wrong semantic information. By designing the puzzle appropriately, the probability that a wrong solution is found can be controlled (as is described later). The auxiliary information may for instance comprise information enabling the device to proceed further in the communication. That is, the serving device, e.g. network node 6, 7, 8 sends a puzzle to the device 5, 9, which solves the puzzle and thereby decodes the auxiliary information, which may for instance comprise information on which communication resources to use next, or certain parameter(s) to use. Hence, the device 5, 9 that has solved the puzzle may then proceed, while a device (e.g. a device used in a DoS attack) that is not able to solve the puzzle is efficiently hindered from proceeding further.

In the following, a tunable puzzle function is described. A secure symmetric key encryption algorithm, such as the AES, is considered, which takes a key of length n and a message of length m and transforms them into a cipher text of length m.

$$AES(key, message) = cipher\ text.$$

For AES, k=128, 192, and 256-bit key sizes are specified. An "AES key" may be distinct from the key associated to the puzzle p, and therefore "AES key" and "puzzle key" are used in the following when required to avoid confusion. Given the AES key, the inverse of AES is straightforward to calculate; this is the decryption algorithm, which is well-defined. It is however noted that considered as a function of the puzzle key, the above function is not 1-1 and thus behaves like a hash function. That is, for given M, $F_M(x)$ =AES(x, M) can be viewed as a hash function. Hence, to create a puzzle p, the whole AES key cannot be revealed since those devices knowing the AES key will hardly need to perform any computations at all, just a single AES computation. On the other hand, in order to make the puzzle p possible to solve in a reasonable time, the whole AES key cannot be completely unknown either. For reducing the effective puzzle key size to t bits, t<k, the AES key may be defined to have e.g. k-t initial zeros and the remaining t bits are denoted by s' (this is thus an example of the aforementioned padding with b=000 . . . 0). One potential puzzle function is $$F(s') = AES(000\ldots 0s', 000\ldots 0) = a\|p$$

That is, any t bits s' such that a||p decrypts to 000 . . . 0 with the AES key 000 . . . 0s' is a solution. As discussed earlier, F(s') can be viewed as a (non 1-1) hash function with potentially many solutions to the same puzzle p. It is noted that a puzzle p is easy to generate efficiently, it is just performing encryption of all zeros using the selected AES key 000 . . . 0s'.

There are several ways to handle the multiple solutions. For instance, if it is easy to generate, e.g., the lexicographically lowest solution, s', then that lexicographically lowest solution, s', could be defined to be the canonical solution (unique solution) whereby the potential problem with multiple solutions is avoided. In other cases another order could be used to define the canonical solution, e.g. the lexicographically highest solution. For example, if puzzles are based on a modular arithmetic function (modulo p) the canonical solution may be defined as having specific properties, in particular number theoretic properties, e.g. belonging to an interval or being a quadratic residue, . . . , etc.

There are however difficulties in trying to define canonical solutions. For example, when considering "lexicographically lowest solution"; for any solution s1 there may be an even smaller solution s2<s1, and the only way to find out would be exhaustive search, which would put a burden on the party generating the puzzle, i.e. adding load to the network node 6, 7, 8. Therefore, in various aspects of the present teachings, a unique solution to the puzzle is not required but will instead make the probability of plural solutions low (as described later).

Before analyzing probability of multiple solutions, some further generalization is made. In order to allow auxiliary information, some degrees of freedom should be left in the decryption value for enabling encoding of this "hidden"

information. This can be achieved by considering the following more general puzzle formulation $$F(s',s'')=AES(000\ldots 0s',000\ldots 0s'')=p \quad (*)$$

where puzzle p is n bits, s' is t bits, and s'' is u bits, and there are m-u preceding zeros before s''. The solution to this puzzle p is any t bits s' and u bits s'' such that p decrypts to $000\ldots 0s''$ with the selected AES key $000\ldots 0s'$. The solution to the puzzle p is the v:=t+u bit solution s:=s'||s'' which is chosen by the network node 6, 7, 8 (or other entity in the network 1) so that relevant auxiliary information is encoded, and then inserted into AES of equation (*) to generate the puzzle p.

It is noted that the auxiliary information can be given as input to the puzzle generation, if and as desired. The auxiliary information may be chosen by the serving device rather than be computed "backwards" from the puzzle, i.e. the auxiliary information may be selected in any desired way. As a particular example: suppose the puzzle solution should encode up-link (UL) grant information in a radio access network. The UL grant may then be encoded as auxiliary information in the puzzle solution. As a concrete example for illustrative purpose, the LTE standard as defined in 3GPP TS 36.213 is used, wherein the UL Grant is a 20-bit binary string comprising Hopping flag—1 bit
Fixed size resource block assignment—10 bits
Truncated modulation and coding scheme—4 bits
TPC command for scheduled PUSCH—3 bits
UL delay—1 bit
CSI request—1 bit The fixed size resource block (denoted FSRB in the following) is basically the frequency on which the client device should transmit. It is noticed that no time slot information is present among the above fields of the UL grant. This is because in current LTE standard, this information is implicit and already known to the client device. Therefore, in order to obtain the desired off-load of the serving device, a time slot information is added, encoded for instance as an additional 10-bit quantity, denoted TS. Thus, the 20-bit binary value FSRB||TS may be viewed as encoding a radio resource and may be used as the s'' value in the puzzle solution, representing the auxiliary information, i.e. s''=FSRB||TS. Next, the serving device, e.g. network node, adjoins a suitable b''. As noted, b'' could be a fixed binary pattern such as "00 . . . 0", and the binary string b''||s'' will be used as one of two parameters to create the puzzle. Alternatively, the whole 20-bit UL Grant value (together with TS) may be directly encoded in s''.

Next, a second input parameter defining the puzzle, denoted b'||s', is constructed. This parameter may be made dependent on the key. Depending on the category of device, the network node may either choose b'||s' as a key known only to certain devices, or the network node may choose b' as a fixed or publicly known string, b'=00 . . . 0 (with a suitable number of zeros to control puzzle difficulty), and may then assign s' randomly. In any case, the final puzzle is defined by: y=F(b'||s', b''||s'') (or parts of the bits in y, see below) where F may be based on AES. It is noted that since the auxiliary information s'' is used as an input to the puzzle creation, it poses no problem for the network node to create a corresponding puzzle. This would have been more problematic if the network node had first chosen y and then attempted to construct input parameters which encodes the desired auxiliary information.

As another example, supposing the puzzle solution should encode a Uniform Resource Locator (URL) to which the device should direct a subsequent request for streaming some content such as a movie or music file. For example, URL="www.example.com". To this end, the network node may for example choose a suitable representation of the URL as a binary string s'' constituting the auxiliary information, e.g. s'' may simply be the sequence of ASCII characters of the URL. Next, the network node adjoins a suitable b''. As noted, b'' could be a fixed binary pattern such as "00 . . . 0", and the binary string b''||s'' will be used as one of two parameters to create the puzzle, and the above described procedure may be followed.

As still another example, supposing the auxiliary information should encode a password. This can be done by encoding the password as a binary string s'', and follow the same procedure as above.

More generally, the following puzzle is considered:

$$AES(b'||s',b''||s'')=a||p \quad (**)$$

where a, b', b'' are known bit strings, the puzzle p is given and s=s'||s'' is the solution. Any of the bit strings may potentially be empty (though not all at the same time).

Considering the equation (), a key of the puzzle function is a subset of b' (or the entire b') which is secret, and may be known only by the devices 5, 9 of a special category and by the network node 6, 7, 8 (and network 1). It is noted that while the "AES key" corresponds to the entire first parameter b'||s', the "puzzle key" is determined by b' (or a subset thereof). It is also noted that if s' is a short string (i.e. so that b' is almost the entire AES key) or even empty, then there is very little computational effort required to calculate s''. If the tunable puzzle p is used to give priority to devices 5, 9 which have the puzzle key, there may be no need to require a computational effort from these devices 5, 9**. In these cases, it is not computationally feasible for anyone to guess neither the AES key nor the puzzle key by trial and error, so other devices will be effectively down-prioritized.

As has been noted, the function F is typically not a one-to-one function, and thus several (b, s) values could give the same (a, p) output. In known prior art puzzles, this would be acceptable as any solution is considered admissible. This would however not work in the method according to the present teachings since finding a solution that is a solution to the puzzle but wrong in that it is not the solution corresponding to a, b means e.g., for the case of a wireless network, that the UE 5 transmits on the wrong radio resource and would not be heard by the network node 6 and/or would cause interference for other UEs. By designing the puzzle appropriately, it is possible to control (limit) the probability that such a wrong solution is found.

Analysis of Uniqueness of Solution

The size n of the puzzle p together with the size of the possible solution space, which is defined by t, u, sets bounds on the probability of collisions. Now, for the question of the uniqueness of the solution, the following heuristic argument is made assuming that the cryptographic function used as basis for F, e.g. Advanced Encryption Standard (AES) or Secure Hash Algorithm 1 (SHA1), behaves randomly. Assuming first that u=0: the number of different solutions s' is $2^t$ and the probability that any specific solution maps to p (or a||p in the more general setting of (**)) can be assumed to be $\frac{1}{2^n}$.

Hence, the expected value of number of collisions, i.e. the expected number of pairs (s1', s2') such that F(s1')=F(s2') is approximately $$E(\#\text{collision-pairs}) \approx 2^{2t-n}$$

If also considering s″, then u more bits degrees of freedom is obtained in the choice of input x, recalling that the number of bits in the solution s=s′+s′ is denoted by v=t+u′. Thus the expected number of collisions becomes about $$E(\#\text{collision-pairs}) \approx 2^{2v-m}$$

This should preferably be much smaller than 1, preferably negligible, for instance less than $2^{-40}$. It is possible to solve for the v and get $$v=(n-40)/2$$

which gives v=44 for n=128 (n=128 is a typical value for cryptographic functions such as e.g. AES).

This may thus also be considered a boundary on the probability that the UE 5 finds an incorrect solution and thereby transmits on the wrong radio resource.

It needs to be verified that the puzzle has not been made "too easy", i.e. that u+t can be made large enough. However, with for instance t ~16 bits 0<u<28 is obtained which is the span for auxiliary information in this case.

It is noted that, given the desired collision probability ε, it is possible to deduce a lower boundary on the parameter m, m>log 2 ($\varepsilon^{-1}$).

Effects on Legacy Error Probability

In the calculations above, a desire is to make the probability for non-unique solutions negligible, which was arbitrarily exemplified to be less than $2^{-40}$. In this section this is put in perspective of legacy error probabilities.

Since the various embodiments of the methods of the present teachings introduce a new type of error, namely failing to access the network and/or disturbing other UEs, two things should be ensured:

1. The probability of an error when the UE 5 attaches using the present scheme should be small compared to the probability of a UE 5 failing to complete a legacy random access procedure, and 2. the probability of a UE 5 using the present scheme causing another UE to fail should be small compared to the probability of a UE 5 becoming disturbed in the legacy solution.

These aspects are considered in turn below.

1. The block error rate (BLER) target for message 2 (random access response) is not standardized but assumed to be of the order of 1%. There is no Hybrid automatic repeat request (HARQ) because there is a risk of collision in message 1, meaning that a colliding UE 5 would then send disturbing/interfering NACKs on the uplink (which must be prevented). The BLER target for message 3 (RRC signaling) is typically 10% but it is sent with HARQ so there would be retransmissions if message 3 fails.

2. When a UE 5 attempts to follow the method of the present teachings but does not arrive at the correct radio resource (or is not authorized to) the UE 5 may send an erroneous message in step 3 (RRC signaling) on a specific but incorrect time, and/or frequency resource. The erroneous message will disturb part of a sub-frame which may be dedicated for another UE, having impact depending on the size of message. This will result in an increase of uplink intra-cell interference, which may result in a retransmission. However, considering that this is a fairly short disturbance it could be handled as a "normal" disturbance, and need not result in any failed messages at all.

In either case, if the probability of using the wrong resource due to the fact that a puzzle has multiple solutions is set to $10^{-12} \sim 2^{-40}$, the additional errors are negligible.

Figure 4:
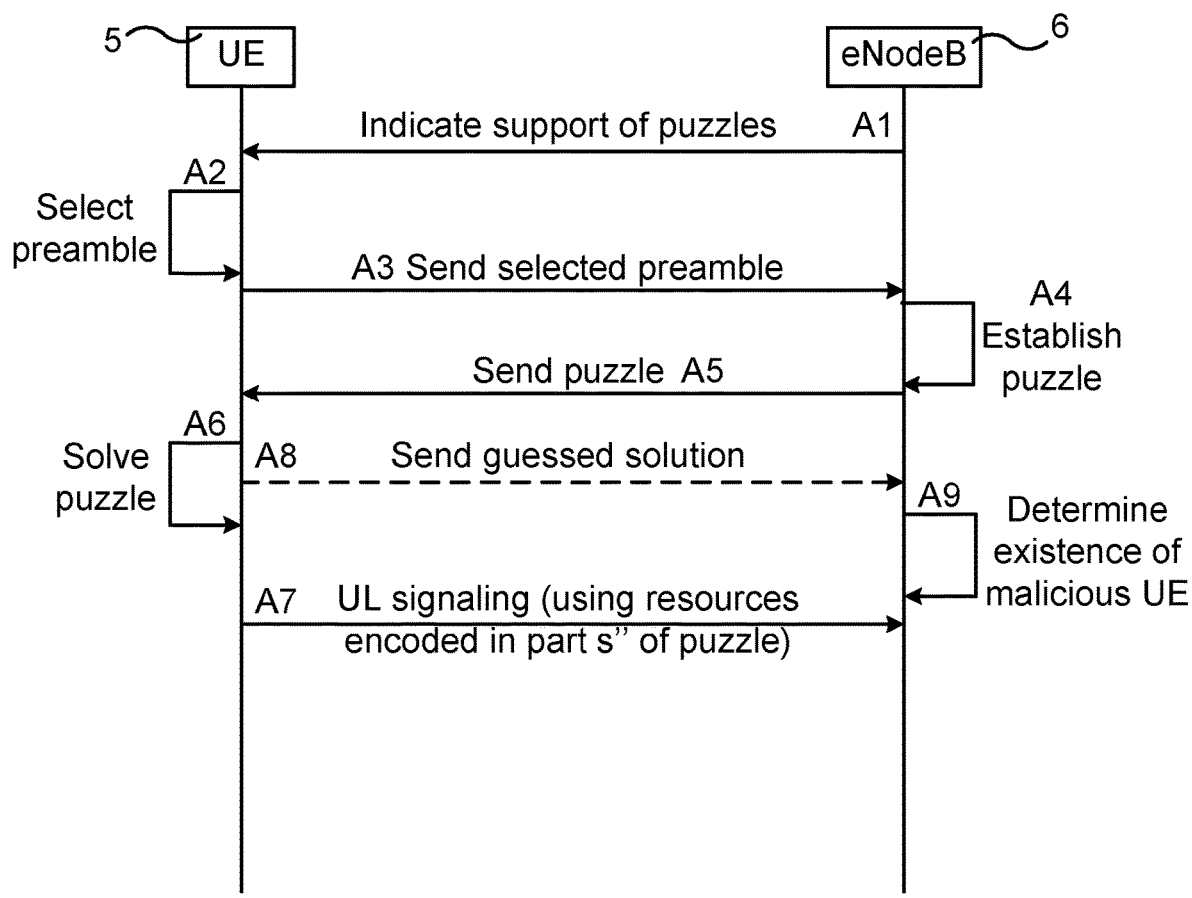
FIG. 4 is a sequence diagram illustrating embodiments of the present teachings.

Next, details of the signaling are described with reference to FIG. 4. FIG. 4 is a sequence diagram illustrating embodiments of the present teachings.

Integration into Signaling

At arrow A1, the network node 6 (e.g. eNodeB as exemplified in FIG. 4) indicates its ability to support puzzles. This can be effectuated e.g. by means of the network node 6 broadcasting this information. If putting this step of indicating in relation to signaling of FIG. 3, this step would occur before Step 1 (i.e. before the sending of random access preamble).

If the method is implemented in a system which also supports legacy UEs, some consideration of backwards compatibility may be necessary. That is, legacy UEs which do not understand puzzles should still be allowed to access the network. One way to achieve this is to use bits reserved for future use to specify reserved frequencies for UEs supporting the puzzle mechanism. This may be complemented with extending the group of preambles, such that new UEs will support two additional categories of radio resources or preambles, whereas legacy UEs will only use the previously defined preambles and radio resources without interfering with this method. A broadcast message may be used to announce that puzzles are supported.

At arrow A2, the UE 5 listens to the broadcast and sends (arrow A3) a preamble from a relevant group accordingly. Legacy UEs will use their group of preambles. New UEs supporting this scheme will have two sets of preambles to select from, as has been described.

At A4, the network node 6 establishes a puzzle, e.g. selects or creates a puzzle in dependence on the received preamble.

At arrow A5, the puzzle p is transported in the random access response. The method according to the present teachings thus involves a change in Step 2, the random access response, wherein the existing radio resource specification is replaced by a puzzle p, the solution to which encodes which radio resources to use.

Now, comparing the bits required to represent a puzzle, it is noted that use of e.g. AES as basis for the function F limits the size of the puzzle to a few fixed values: m=128, 192, 256 bits. Using the well-known Luby-Rackoff construction based on AES or any hash function, it is possible to construct a puzzle function "F" with n bit puzzles for any (even) n<128 e.g. n=40.

The complete random access response in arrow A5 (step 2 of FIG. 3) is estimated to be about 10 bytes=80 bits for a 5 MHz system and somewhat larger with larger system bandwidth. Given that the system is in an overload situation, it may be acceptable to use more bits for random access responses and thus allow the inclusion of a larger puzzle.

It is also possible to consider trimming the puzzle at the cost of an increased error rate (finding wrong resource).

At arrow A6, the UE 5, having received the puzzle p with the random access response, solves the puzzle and hence obtains a solution s=(s′, s″). As mentioned earlier, the solution s (e.g. the s″ part) indicates which radio resources to use in order to be able proceed further. At arrow A7, hence, the UE 5 that has correctly solved the puzzle p will now be able to transmit in uplink. In particular, by having solved the puzzle, the UE 5 has also decoded the auxiliary information relating to which resources to use in the uplink (UL) signaling, the auxiliary information having been encoded into the puzzle by the network node 6, 7, 8.

A malicious UE that has not solved the puzzle is only guessing which resources to use (arrow A8). The network node 6 may implement ways to determine existence of malicious UEs (arrow A9). That is, the network node 6 may determine that a particular UE is malicious in that it is only guessing, e.g. by the network node 6 scanning also incorrect resources and interpreting the use of such resources as an indication that the UE 5 is malicious.

It is noted that once the UE 5 has obtained the puzzle solution s (arrow A5), the solution s must be mapped to physical radio resources which is described next.

Mapping Solution s to a Radio Resource to be Used in UL Signaling

The UE 5 needs to implement procedures and functions for carrying out the steps:

Puzzle→solution→resource to use

The network node 6, e.g. a scheduler therein, makes the mapping in reverse order:

Resource to use→solution→Puzzle, which is the easiest and most straightforward way. In the following, the required size of the solution to the puzzle for representing the resource to use is considered.

With the construction described earlier, it is possible to index v=u+t resources (combining the bits of s' and s"). There are two components of the solution: one part (s') defines the workload required by the UE to find the solution. The other part (s") allows for encoding additional information bits, enabling a larger space of radio resources.

As an example, for a 20 MHz LTE system there are 100 resource blocks (RB) which means 7 bits are needed to address them all individually. Then for instance 4 bits are needed to address 16 different time instances relative reception of the random access response (RAR) message. This example would give 12 bits to address a frequency/time-resource by encoding it in the bits of s' and/or s". For larger packets there would be a need to address not just one RB (180 kHz) but several, and hence a start RB-index AND the number of RBs are needed. Another parameter can be the number of antennas of the network node. There are several options here, but 12-16 bits can be seen as a minimum for a 20 MHz system. Other parameter(s) could be coding scheme or modulation.

However, on the other hand, for instance at least 16 bits are needed to get a sufficiently difficult puzzle, so in one embodiment, all the bits encoding radio resources can be included in s'. In that case s" could just be a fixed bit string defined by the standard, i.e. s"=000 . . . 0 or possible to calculate for the UE based on other well-defined information known by both UE and network node 6 at the time of sending the puzzle.

The significance of s' and s" are recapitulated once again:
the number of bits in s' (i.e. t), controls the difficulty of the puzzle and may also be used to identity radio resources,
the number of bits in s" (i.e. u), does not affect the difficulty of the puzzle but may provide additional bits to encode radio resources (e.g. if the number of bits in s' is too small).

The tunable puzzles, mentioned earlier, are particularly advantageous since it is possible to tune the difficulty of puzzle independently from the number of radio resources.

Alternatively, instead of encoding radio resource information as solution to one puzzle, the information may be distributed over solutions to multiple sub-puzzles using e.g. known client puzzle techniques. One particular embodiment is to embed time-slot information in one puzzle, and frequency information in another puzzle.

As noted earlier, there are several cases when a random access procedure is used. The same mechanism to provide access priority or overload handling can be applied to all these cases, e.g. handover to overloaded network node, or to manage scheduling requests when uplink resource is missing. A special preamble and/or puzzle key can be used in that case, to tune its priority in comparison to other requests.

Figure 5:
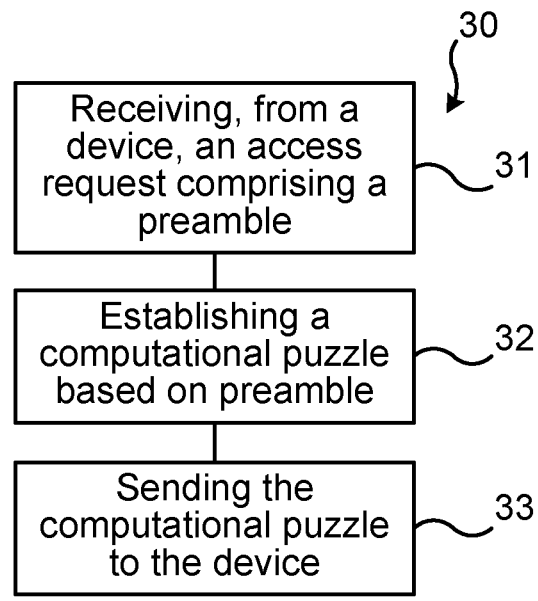
FIG. 5 illustrates a flow chart over steps of a method in a network node in accordance with the present teachings.

The features and embodiments of the present teachings that have been described may be combined in different ways, examples of which are given in the following, with reference first to FIG. 5. FIG. 5 illustrates a flow chart over steps of a method for a network node 6, 7, 8 of a network 1 of providing a device access to the network 1. The method 30 comprises receiving 31, from a device 5, 9, an access request comprising a preamble. The network node 6, 7, 8 may be a network node of a radio access network 3, e.g. comprise an eNB 6, 6a, or it may be a network node of a wired network and e.g. comprise a server 8.

The method 30 comprises establishing 32, in response to the access request, a computational puzzle based on the received preamble.

The method 30 comprises sending 33 information indicative of the computational puzzle to the device 5, 9. The information indicative of the computational puzzle may comprise the entire computational puzzle. In other embodiments, the information indicative of the computational puzzle comprises parts of the computational puzzle, while other parts of the computational puzzle, or definition of the computational puzzle, may be implicit, preconfigured or known in some other way by the device 5, 9.

The method 30 provides a back-off mechanism for the network node 6, 7, 8 for access requests. The access requests may comprise access requests for wireless access or for access to a wired network. The network node 6, 7, 8 is provided with a means for load balancing by establishing, in response to a received preamble, a certain computational puzzle. For instance, if a first type of preamble is received a certain type of computational puzzle may be established, wherein the computational puzzle for instance may comprise a mathematical problem to be solved. The solution to the computational puzzle can be of varying level of difficulty, thereby creating idle time for the network node.

In an embodiment, the establishing 32 comprises encoding auxiliary information in a part s" of a solution s', s" to the computational puzzle.

In an embodiment, the auxiliary information comprises information enabling the device 5, 9 to proceed further in an access gaining process. This efficiently limits the load or even excludes any unauthorized devices from accessing the network.

In a variation of the above embodiment, the information enabling the device 5, 9 to proceed further in the access gaining process comprises information on communication resources to use for a subsequent signaling.

In an embodiment, the establishing 32 comprises establishing, for a first group of preambles, a first type of computational puzzle, to which the solution relies on a key, and establishing, for a second group of preambles, a second type of computational puzzle, to which the solution is independent of a key. That is, if the preamble that the network node 6, 7, 8 receives from the device 5, 9 is from the first group of preamble then a first type of computational puzzle is established, wherein the solution relies on a key. If the preamble that the network node 6, 7, 8 receives from the device 5, 9 is from the second group of preamble then a second type of computational puzzle is established, wherein the solution is independent of a key.

In a variation of the above embodiment, the first group of preambles comprises preambles associated with a set of prioritized devices and wherein the second group of preambles comprises preambles associated with a set of non-prioritized devices.

In various embodiments, the preambles are grouped into at least two groups, wherein at least a first group of preambles is used by devices 5, 9 in a connected state and at least a second group of preambles is used by devices 5, 9 in a non-connected state.

In various embodiments, the establishing 32 comprises:
setting a level of difficulty to solve the computational puzzle, wherein the level is set differently for a computational puzzle for a first group of preambles compared to a computational puzzle for a second group of preambles, and
establishing the computational puzzle based on the received preamble. The establishing may for instance comprise the network node 6, 7, 8 creating the computational puzzle, or it may comprise the network node 6, 7, 8 retrieving a pre-computed computational puzzle e.g. from a database, or it may comprise receiving the computational puzzle from another network node or device.

In a variation of the above embodiments, the level of difficulty to solve the computational puzzle is set in dependence on load of the network node 6, 7, 8. The level of difficulty may for instance be increased when the network node 6, 7, 8 is highly loaded, thereby creating more idle time for it, since the devices will most likely need more time for solving the computational puzzle.

In an embodiment, the method 30 further comprises:
receiving, from the device 5, 9 a response to the computational puzzle, and
determining, based on the response and on an identification of the device 5, 9, whether or not the device 5, 9 is an illegitimate device.

Figure 6:
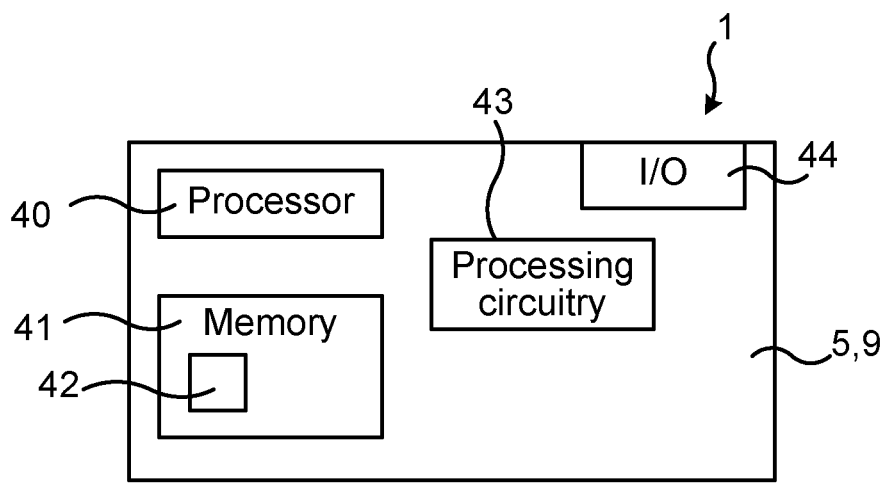
FIG. 6 illustrates schematically network nodes, devices and means for implementing methods of the present disclosure.
Figure 6:
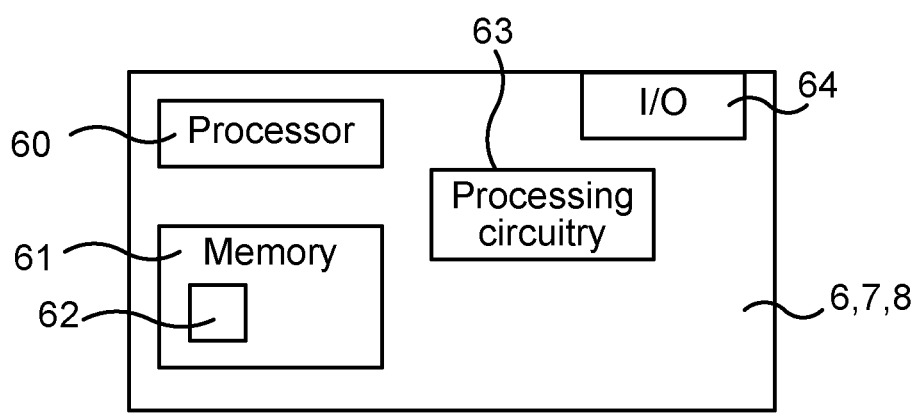

FIG. 6 illustrates schematically network nodes, devices and means for implementing methods of the present disclosure. The various embodiments of the method 30 as described e.g. in relation to FIG. 5 may be implemented e.g. in a radio access network, and in particular a network node 6, 7, 8, e.g. such as an eNB, thereof. Embodiments of the method 30 may also be implemented in wired networks, e.g. in a network node in the form of a server of a cluster of servers (e.g. Internet), to which access is requested by devices 5, 9.

The network node 6, 7, 8 (also described with reference to FIG. 1) comprises a processor 60 comprising any combination of one or more of a central processing unit (CPU), multiprocessor, microcontroller, digital signal processor (DSP), application specific integrated circuit etc. capable of executing software instructions stored in a memory 61 which can thus be a computer program product 61. The processor 60 can be configured to execute any of the various embodiments of the method for instance as described in relation to FIG. 5.

The memory 61 can be any combination of read and write memory (RAM) and read only memory (ROM), Flash memory, magnetic tape, Compact Disc (CD)-ROM, digital versatile disc (DVD), Blu-ray disc, solid state drive (SSD) etc. The memory 61 also comprises persistent storage, which, for example, can be any single one or combination of magnetic memory, optical memory, solid state memory or even remotely mounted memory.

The network node 6, 7, 8 may also comprise processing circuitry 63, comprising e.g. computer circuitry, such as one or more microprocessor-based circuits, DSP-based circuits, FPGA-based circuits, ASIC-based circuits, or other digital processing circuitry for implementing various steps of the method. Such circuitry may comprise fixed processing circuitry or programmed processing circuitry, or a mix of both fixed and programmed processing circuitry.

The network node 6, 7, 8 may also comprise an input/output device 64 (indicated by I/O in FIG. 6) for communicating with other entities. Such input/output device 64 may for instance comprise a communication interface, antenna system and/or a wired connection to other network nodes 6, 7, 8.

The present teachings provide computer programs 62 for the network node 6, 7, 8. The computer program 62 comprises computer program code, which, when executed on at least one processor 60 on the network node 6, 7, 8 causes the network node 6, 7, 8 to perform the method 30 according to any of the described embodiments thereof.

The present disclosure also encompasses computer program products 61 comprising a computer program 62 for implementing the embodiments of the method as described, and a computer readable means on which the computer program 62 is stored. The computer program product 61 may, as mentioned earlier, be any combination of random access memory (RAM) or read only memory (ROM), Flash memory, magnetic tape, Compact Disc (CD)-ROM, digital versatile disc (DVD), Blu-ray disc etc.

A network node 6, 7, 8 of a network 1 of providing a device 5, 9 access to the network 1 is provided. The network node 6, 7, 8 is configured to:
receive, from a device 5, 9, an access request comprising a preamble,
establish, in response to the access request, a computational puzzle based on the received preamble, and
send information indicative of the computational puzzle to the device 5, 9.

The network node 6, 7, 8 may be configured to perform the above steps e.g. by comprising a processor 60 and memory 61, the memory 21 containing instructions executable by the processor 60, whereby the network node 6, 7, 8 is operative to perform the steps.

In an embodiment, the network node 6, 7, 8 is configured to establish by encoding auxiliary information in a part s" of a solution s', s" to the computational puzzle.

In various embodiments, the auxiliary information comprises information enabling the device 5, 9 to proceed further in an access gaining process.

In some embodiments, the information enabling the device 5, 9 to proceed further in the access gaining process comprises information on communication resources to use for a subsequent signaling.

In an embodiment, the network node 6, 7, 8 is configured to establish by establishing, for a first group of preambles, a first type of computational puzzle, to which the solution relies on a key, and establishing, for a second group of preambles, a second type of computational puzzle, to which the solution is independent of a key.

In an embodiment, the first group of preambles comprises preambles associated with a set of prioritized devices and wherein the second group of preambles comprises preambles associated with a set of non-prioritized devices.

In an embodiment, the preambles are grouped into at least two groups, and wherein at least a first group of preambles is used by devices 5, 9 in a connected state and at least a second group of preambles is used by devices 5, 9 in a non-connected state.

In an embodiment, the network node 6, 7, 8 is configured to establish by:
  setting a level of difficulty to solve the computational puzzle, wherein the level is set differently for a computational puzzle for a first group of preambles compared to a computational puzzle for a second group of preambles, and
  establishing a computational puzzle based on the received preamble, and In an embodiment, the network node 6, 7, 8 is configured to set the level of difficulty to solve the computational puzzle in dependence on load of the network node 6, 7, 8.

In an embodiment, the network node 6, 7, 8 is configured to:
  receive, from the device 5, 9 a response to the computational puzzle, and
  determine, based on the response and on an identification of the device 5, 9, whether or not the device 5, 9 is an illegitimate device.

The computer program products, or the memories, comprises instructions executable by the processor 60. Such instructions may be comprised in a computer program, or in one or more software modules or function modules.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In particular, a network node for of a network of providing a device access to the network is provided. The network node comprises first means for receiving, from a device, an access request comprising a preamble. The first means may for instance comprise an input/output device as described earlier, e.g. a wireless communication interface, and/or any type of processing circuitry for receiving data and/or antenna circuitry.

The network node comprises second means for establishing, in response to the access request, a computational puzzle based on the received preamble. The second means may for instance comprise processing circuitry adapted to establish computational puzzles using program code stored in a memory.

The network node comprises third means for sending information indicative of the computational puzzle to the device. The third means may for instance comprise an input/output device as described earlier, e.g. a wireless communication interface, and/or any type of processing circuitry for transmitting data and/or antenna circuitry.

The network node may comprise yet additional means for implementing any of the features and steps of the embodiments that have been described. For instance, the network node may comprise means for encoding auxiliary information in a part of a solution to the computational puzzle. Such means may for instance comprise processing circuitry adapted to establish by encoding auxiliary information using program code stored in a memory.

Figure 7:
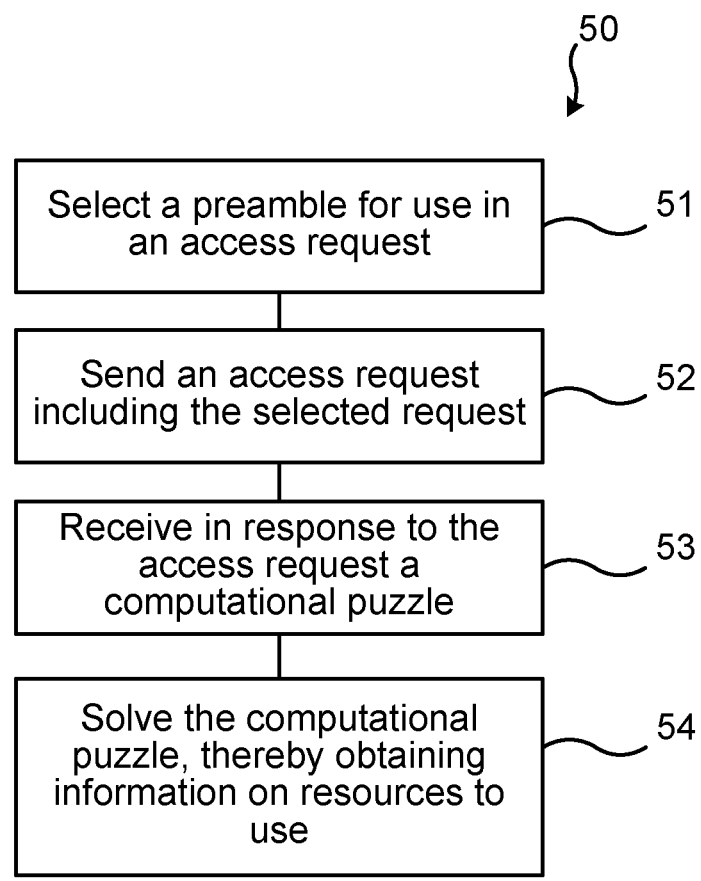
FIG. 7 illustrates a flow chart over steps of a method in a device in accordance with the present teachings.

FIG. 7 illustrates a flow chart over steps of a method in a device in accordance with the present teachings. The method may be performed in a device 5, 9 requesting access to some service provided by a network 1. The device 5, 9 may for instance comprise a device in a radio access network, e.g. a mobile terminal, requesting access to a network node 6, 7, 8 such as a base station or an access point through with the service is provided. As another example, the device 5, 9 may comprise a device, e.g. a client device, communicating with a wired network, e.g. seeking access to an application of a server.

The method 50 comprises selecting 51 a preamble for use in an access request.

The method 50 comprises sending 52, to the network node 6, 7, 8 the access request, including the selected preamble.

The method 50 comprises receiving 53, in response to the access request, information indicative of a computational puzzle from the network node 6, 7, 8.

The method 50 comprises solving 54 the computational puzzle, thereby obtaining information on communication resources to use in subsequent signaling to the network node 6, 7, 8.

The method 50 may provide e.g. a mobile terminal that has just lost its synchronization to a radio access network and hence lost an ongoing connection, means for selecting a preamble according to its state. The mobile terminal is provided with a way of rapidly changing to a state in which it is back in synchronization, since it may select a preamble accordingly (by virtue of it being in connected state). By solving a received computational puzzle it is made aware of which communication resources to use for proceeding further in the communication.

In an embodiment, the selecting 51 comprises establishing whether the device is a prioritized device 5, 9 or a non-prioritized device 5, 9 and selecting the preamble based thereon.

In an embodiment, the selecting 51 comprises determining whether or not the device has access to a key shared with the network node 6, 7, 8, and selecting a first type of preamble if it has access to the key and else selecting a second type of preambles.

In an embodiment, the preambles are grouped into at least two groups, and wherein the selecting 51 comprises selecting a preamble from a first group of preambles when being in a connected state and selecting a preamble from a second group of preambles when being in a non-connected state.

In an embodiment, the solving 54 comprises using a key shared with the network node 6, 7, 8 and obtaining the information on communication resources by decoding auxiliary information encoded in a part s" of a solution s', s" of the computational puzzle.

With reference again to FIG. 6, a device 5, 9 and means for implementing embodiments of the present teachings are provided. The various embodiments of the method 50 as described e.g. in relation to FIG. 7 may be implemented in the device 5, 9.

The device 5, 9 (also described with reference to FIG. 1) comprises a processor 40 comprising any combination of one or more of a central processing unit (CPU), multiprocessor, microcontroller, digital signal processor (DSP), application specific integrated circuit etc. capable of executing software instructions stored in a memory 41 which can thus be a computer program product 41. The processor 40 can be configured to execute any of the various embodiments of the method for instance as described in relation to FIG. 7.

The memory 41 can be any combination of read and write memory (RAM) and read only memory (ROM), Flash memory, magnetic tape, Compact Disc (CD)-ROM, digital versatile disc (DVD), Blu-ray disc, solid state drive (SSD) etc. The memory 41 also comprises persistent storage, which, for example, can be any single one or combination of magnetic memory, optical memory, solid state memory or even remotely mounted memory.

The device 5, 9 may also comprise processing circuitry 43, comprising e.g. computer circuitry, such as one or more microprocessor-based circuits, DSP-based circuits, FPGA-based circuits, ASIC-based circuits, or other digital processing circuitry for implementing various steps of the method. Such circuitry may comprise fixed processing circuitry or programmed processing circuitry, or a mix of both fixed and programmed processing circuitry.

The device 5, 9 may also comprise an input/output device 44 (indicated by I/O in FIG. 6) for communicating with other entities. Such input/output device 44 may for instance comprise a communication interface, antenna devices, receiving and transmitting circuitry etc.

The present teachings provide computer program 42 for the device 5, 9. The computer program 42 comprises computer program code, which, when executed on at least one processor 40 on the device 5, 9 causes the device 5, 9 to perform the method 50 according to any of the described embodiments thereof.

The present disclosure also encompasses computer program products 41 comprising a computer program 42 for implementing the embodiments of the method as described, and a computer readable means on which the computer program 242 is stored. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

A device 5, 9 for accessing a network 1 comprising a network node 6, 7, 8 is provided. The device 5, 9 is configured to:

select a preamble for use in an access request,
  send, to the network node 6, 7, 8 the access request, including the selected preamble,
  receive, in response to the access request, information indicative of a computational puzzle from the network node 6, 7, 8, and
  solve the computational puzzle, thereby obtaining information on communication resources to use in subsequent signaling to the network node 6, 7, 8.

The device 5, 9 may be configured to perform the above steps e.g. by comprising a processor 40 and memory 41, the memory 21 containing instructions executable by the processor 40, whereby the device 5, 9 is operative to perform the steps.

In an embodiment, the device 5, 9 is configured to select by establishing whether the device is a prioritized device 5, 9 or a non-prioritized device 5, 9 and selecting the preamble based thereon.

In an embodiment, the device 5, 9 is configured to select by determining whether or not the device has access to a key shared with the network node 6, 7, 8, and configured to select a first type of preamble if it has access to the key and else to select a second type of preambles.

In various embodiments, the preambles are grouped into at least two groups, and wherein the selecting 51 comprises selecting a preamble from a first group of preambles when being in a connected state and selecting a preamble from a second group of preambles when being in a non-connected state.

In an embodiment, the device 5, 9 is configured to solve by using a key shared with the network node 6, 7, 8 and obtaining the information on communication resources by decoding auxiliary information encoded in a part s'' of a solution s', s'' of the computational puzzle.

The computer program products, or the memories, comprises instructions executable by the processor 40. Such instructions may be comprised in a computer program, or in one or more software modules or function modules.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In particular, a device for accessing a network comprising a network node is provided. The device comprises first means for selecting a preamble for use in an access request. The first means may for instance comprise processing circuitry adapted for performing such selecting by using program code stored in a memory.

The device comprises second means for sending, to the network node the access request, including the selected preamble. The second means may for instance comprise an input/output device as described earlier, e.g. a wireless communication interface, and/or any type of processing circuitry for sending data and/or antenna circuitry.

The device comprises third means for receiving, in response to the access request, information indicative of a computational puzzle from the network node. The third means may for instance comprise an input/output device as described earlier, e.g. a wireless communication interface, and/or any type of processing circuitry for receiving data and/or any antenna circuitry.

The device comprises fourth means for solving the computational puzzle, thereby obtaining information on communication resources to use in subsequent signaling to the network node. The fourth means may for instance comprise processing circuitry adapted to solve the computational puzzle using program code stored in a memory.

In summary, the present teachings provides, in various embodiments, methods that works as a back-off mechanism for radio access, thereby enabling a load regulation and overload protection of a network node (e.g. a base station). The method also provides means for defining different service levels as a function of time and category of device.

A difficulty of the puzzle can be set based on the current degree of overload, which makes the method effective in different load situations.

Using different keys that may be pre-distributed to different categories of devices provides means to give different access priority to different devices even before they can be identified. If there are few access resources available, those with high priority keys will have better chances of getting these resources. The present teachings also enable encoding information into puzzle solution without affecting difficulty of puzzles.

The method may be used to prevent devices not having a key from accessing the network, or to give restricted access to devices without a key.

In various embodiments, the method does not require any additional bandwidth for transmitting the solution to the puzzle, and does not require a server to process and verify that the solution is correct: the fact that the client uses the solution-encoded radio resource is proof of the correct solution having been obtained.

In another aspect, the method hides the uplink radio resource to eavesdroppers which do not possess the key required to solve the puzzle, and hence makes it more difficult to selectively/secretly disturb the attachment process by jamming selected radio resources. Only by jamming the entire RACH will it be possible to prevent a particular device from obtaining access, and such interference is more easily detected.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for providing access to a network, the method comprising:
   receiving an access request transmitted by a device, the access request comprising a preamble;
   obtaining, in response to the access request, a computational puzzle based on the received preamble, wherein obtaining the computational puzzle based on the received preamble comprises:
      determining whether the received preamble is included in a prioritized set of preambles or in a non-prioritized set of preambles;
      selecting a first type of computational puzzle as a result of determining that the received preamble is included in the prioritized set of preambles; and
      selecting a second type of computational puzzle that is more difficult to solve than the first type of computational puzzle as a result of determining that the received preamble is included in the non-prioritized set of preambles; and
   sending information indicative of the computational puzzle to the device.

2. The method of claim 1, wherein a solution to the computational puzzle comprises auxiliary information.

3. The method of claim 2, wherein the auxiliary information comprises information enabling the device to proceed further in an access gaining process.

4. The method of claim 1, further comprising:
   receiving, from the device, a response to the computational puzzle, and
   determining, based on the response and on an identification of the device, whether or not the device is an illegitimate device.

5. The method of claim 1, wherein the computational puzzle of the first type requires that the device have a certain key in order for the device to efficiently solve the computational puzzle.

6. The method of claim 1, wherein solving the computational puzzle of the second type is not dependent on a key.

7. A method for providing access to a network, the method comprising:
   receiving an access request transmitted by a device, the access request comprising a preamble;
   obtaining, in response to the access request, a computational puzzle based on the received preamble, wherein a solution to the computational puzzle comprises auxiliary information, the auxiliary information comprises information enabling the device to proceed further in an access gaining process, and the information enabling the device to proceed further in the access gaining process comprises information on communication resources to use for a subsequent signaling; and
   sending information indicative of the computational puzzle to the device.

8. A network node of a network for providing a device with access to the network, the network node comprising:
   a receiver;
   a transmitter; and
   processing circuitry coupled to the receiver and the transmitter, wherein the network node is configured to:
      receive, from the device, an access request comprising a preamble;
      obtain, in response to the access request, a computational puzzle based on the received preamble, wherein obtaining the computational puzzle based on the received preamble comprises:
         determining whether the received preamble is included in a prioritized set of preambles or in a non-prioritized set of preambles;
         selecting a first type of computational puzzle as a result of determining that the received preamble is included in the prioritized set of preambles; and
         selecting a second type of computational puzzle that is more difficult to solve than the first type of computational puzzle as a result of determining that the received preamble is included in the non-prioritized set of preambles; and
      send information indicative of the computational puzzle to the device.

9. The network node of claim 8, wherein a solution to the computational puzzle comprises auxiliary information.

10. The network node of claim 9, wherein the auxiliary information comprises information enabling the device to proceed further in an access gaining process.

11. The network node of claim 8, wherein the network node is further configured to:
    receive, from the device, a response to the computational puzzle, and
    determine, based on the response and on an identification of the device, whether or not the device is an illegitimate device.

12. A network node of a network for providing a device with access to the network, the network node comprising:
    a receiver;
    a transmitter; and
    processing circuitry coupled to the receiver and the transmitter, wherein the network node is configured to:
       receive, from the device, an access request comprising a preamble;
       obtain, in response to the access request, a computational puzzle based on the received preamble, wherein a solution to the computational puzzle comprises auxiliary information, the auxiliary information comprises information enabling the device to proceed further in an access gaining process, and the information enabling the device to proceed further in the access gaining process comprises information on communication resources to use for a subsequent signaling; and
       send information indicative of the computational puzzle to the device.

13. A method for accessing a network comprising a network node, the method comprising:
    selecting a preamble;
    sending an access request to the network node, the access request comprising the selected preamble;
    receiving a computational puzzle information transmitted by the network node in response to the access request, the computational puzzle information indicating a computational puzzle;
    solving the indicated computational puzzle, wherein the solution to the computational puzzle or parts of the solution to the computational puzzle specifies one or more parameters necessary to access one or more parts of a physical medium; and
    as a result of solving the indicated computational puzzle, obtaining information on communication resources to use in subsequent signaling to the network node, wherein the obtained information includes the one or more parameters necessary to access the one or more parts of the physical medium.

14. The method of claim 13, wherein the selecting comprises establishing whether the device is a prioritized device or a non-prioritized device and selecting the preamble based thereon.

15. The method of claim 13, wherein the selecting comprises determining whether or not the device has access to a key shared with the network node, and selecting a first type of preamble if it has access to the key and else selecting a second type of preambles.

16. The method of claim 13, wherein the preambles are grouped into at least two groups, and wherein the selecting comprises selecting a preamble from a first group of preambles when being in a connected state and selecting a preamble from a second group of preambles when being in a non-connected state.

17. The method of claim 13, wherein the solving comprises using a key shared with the network node and obtaining the information on communication resources by decoding auxiliary information encoded in a part of a solution of the computational puzzle.

18. A device for accessing a network comprising a network node,
the device comprising:
a receiver;
a transmitter; and
processing circuitry coupled to the receiver and the transmitter, wherein the device is configured to:
select a preamble;
send an access request to the network node, the access request comprising the selected preamble;
receive information transmitted by the network node in response to the access request, the information being indicative of a computational puzzle from the network node;
solve the computational puzzle, wherein the solution to the computational puzzle or parts of the solution to the computational puzzle specifies one or more parameters necessary to access one or more parts of a physical medium; and
as a result of solving the computational puzzle, obtain information on communication resources to use in subsequent signaling to the network node, wherein the obtained information includes the one or more parameters necessary to access the one or more parts of the physical medium.

19. The device of claim 18, configured to select by establishing whether the device is a prioritized device or a non-prioritized device and selecting the preamble based thereon.

20. The device of claim 18, configured to select by determining whether or not the device has access to a key shared with the network node, and configured to select a first type of preamble if it has access to the key and else to select a second type of preambles.

21. The device of claim 18, wherein the preambles are grouped into at least two groups, and wherein the selecting comprises selecting a preamble from a first group of preambles when being in a connected state and selecting a preamble from a second group of preambles when being in a non-connected state.

22. The device of claim 18, configured to solve by using a key shared with the network node and obtaining the information on communication resources by decoding auxiliary information encoded in a part of a solution of the computational puzzle.

* * * * *